United States Patent
Sera et al.

(10) Patent No.: US 6,702,472 B2
(45) Date of Patent: Mar. 9, 2004

(54) WHEEL BEARING DEVICE AND METHOD OF CRIMPING THE SAME

(75) Inventors: Akira Sera, Iwata (JP); Katsuhiko Nishio, Iwata (JP); Syougo Suzuki, Iwata (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 09/935,197

(22) Filed: Aug. 23, 2001

(65) Prior Publication Data

US 2002/0051597 A1 May 2, 2002

(30) Foreign Application Priority Data

Aug. 24, 2000 (JP) ........................... 2000-254311
Sep. 4, 2000 (JP) ........................... 2000-267427
Dec. 28, 2000 (JP) ........................... 2000-400411

(51) Int. Cl.$^7$ ............................................... F16C 13/60
(52) U.S. Cl. ...................................... 384/489; 384/544
(58) Field of Search ............................... 384/537, 544, 384/489

(56) References Cited

U.S. PATENT DOCUMENTS 4,798,560 A * 1/1989 Farrell ........................ 464/178
6,217,220 B1 * 4/2001 Ohkuma et al. ............ 384/489
6,280,096 B1 * 8/2001 Miyazaki et al. ........... 384/544

* cited by examiner

Primary Examiner—Matthew C. Graham
(74) Attorney, Agent, or Firm—Arent Fox Kintner Plotkin & Kahn PLLC (57) ABSTRACT

A wheel bearing device having an outer ring with an attachment flange and two rows of raceway surfaces in the inner periphery, a hub ring having a wheel-attaching flange and one raceway surface in the outer periphery, an inner ring fitted on a stepped portion of the hub ring and having the other raceway surface in the outer periphery, and two rows of rolling elements. The end of the hub ring is crimped for integration, wherein the pre-crimping end on the hub ring is a hollow cylindrical portion with wall-thickness gradually increases toward the front end. Crimping imparts preload to the rolling elements and is effected by measuring the before-crimping axial dimension and controlling the lower dead point of a crimping punch according to the axial dimension so that the worked head height of the crimp portion is made constant.

12 Claims, 6 Drawing Sheets

WHEEL BEARING DEVICE AND METHOD OF CRIMPING THE SAME

BACKGROUND OF THE INVENTION

The present invention relates to a wheel bearing device for rotatably supporting wheels with respect to suspensions for automobiles, and a method of crimping for the wheel bearing device which is performed in order to apply a preload to the rolling elements of the wheel bearing device.

Figure 8:
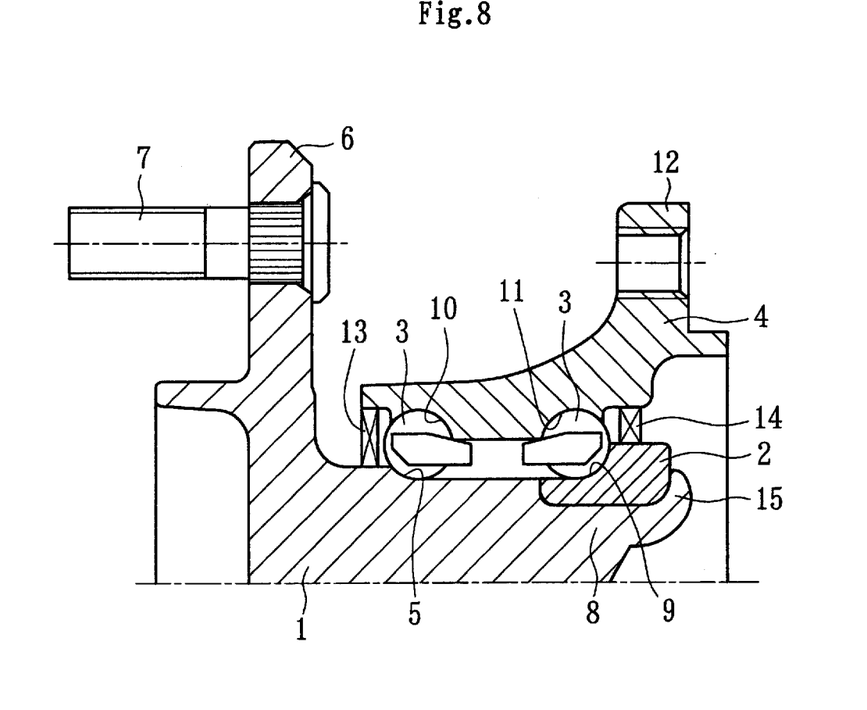
FIG. 8 is a half section showing a conventional example of a wheel bearing device.

As to wheel bearing devices for rotatably supporting wheels with respect to the suspension of an automobile, there are those which are disclosed, for example, in Japanese Patent Kokai Hei 10-95203, Japanese Patent Kokai Hei 10-196661, Japanese Patent Kokai Hei 10-272903, and Japanese Patent Kokai Hei 11-129703. Typical of these is Japanese Patent Kokai Hei 10-272903, and the wheel bearing device disclosed therein is shown in FIG. 8.

This wheel bearing device comprises a hub ring 1, an inner ring 2, two rows of rolling elements 3, and an outer ring 4.

The hub ring 1 is formed on its outer peripheral surface with a raceway surface 5 on the outboard side and is provided with a flange 6 for attaching a wheel (not show). Hub bolts 7 for fixing a wheel disk are circumferentially equidistantly attached in the flange 6. Further, the inner ring 2 is fitted in a small-diameter stepped portion 8 formed on the inboard side of the hub ring 1, and is formed at its outer peripheral surface with a raceway surface 9 on the inboard side. The inner ring 2 is press-fitted with a suitable amount of interference in order to prevent creep. The raceway surfaces 5 and 9 positioned on the outboard and inboard sides of a vehicle, respectively, cooperate with each other to constitute two rows of raceway surfaces.

The outer ring 4 is formed at its inner peripheral surface with two rows of raceway surfaces 10 and 11 opposed to the raceway surfaces 5 and 9 of the hub ring 1 and inner ring 2 and is provided with a flange 12 for attachment to the vehicle. Rolling elements 3 are installed between the raceway surfaces 5, 9 of the hub ring 1 and inner ring 2 and two rows of raceway surfaces 10 and 11 of the outer ring 4. Seals 13 and 14 are installed in the openings in the opposite ends of the wheel bearing, that is, between the outer peripheral surfaces of the hub ring 1 and inner ring 2 and the inner peripheral surface of the outer ring 4, so as to prevent leakage of the grease filled therein and intrusion of water or foreign matter from outside.

Figure 9:
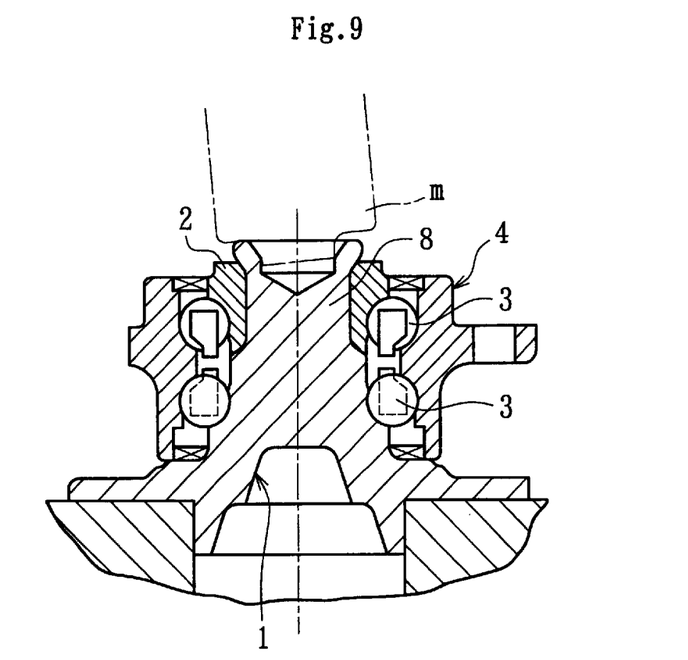
FIG. 9 is a longitudinal section of the wheel bearing device during crimping, for explaining the conventional example.

In the case where this wheel bearing device is used for driven wheels, in order to prevent falling of the inner ring 2 press-fitted in the small-diameter stepped portion 8 of the hub ring 1, the cylindrical end of the hub ring 1 is diametrically outwardly crimped by a swing type crimping punch $m$, as shown in FIG. 9, and the inner ring 2 is fixed on the hub ring 1 by the thus-formed crimped portion 15. Crimping the end of the hub ring 1 sets the bearing clearance at a predetermined value and applies a proper preload.

As to this crimping method, there is one as known from Germany Patent DE19613441A1, which comprises the steps of finding a load-displacement curve for the end of the hub ring 1 in cold-working the crimped portion, and controlling the punch $m$ such that the terminal point of this displacement curve corresponds to a predetermined load value proportional to the required amount of preload. Besides this, there is a common method for crimping, with the lower dead point of the punch $m$ kept constant.

In this connection, with the conventional wheel bearing device described above, when the crimped portion 15 is formed by plastically deforming the end of the hub ring 1 in order to fix the inner ring 2 on the hub ring 1, the outer diameter surface of the inner rig 2 bulges diametrically outward, resulting in causing nonnegligible deformation in the raceway surface 9 formed on the outer diameter surface of the inner ring 2, and excessive circumferential stresses in the positions where the rolling elements 3 contact the inner ring 2, sometimes shortening the rolling fatigue life. Thus, in order to inhibit the increase of circumferential stresses at contact positions caused by crimping, it is necessary that the dimension from the contact position to the crimped portion 15 be greater than the predetermined value; thus, the inner ring 2 has inevitably increased axially on the inboard side.

On the other hand, while the bearing clearance is set at a predetermined value by crimping the end of the hub ring 1, as described above, if such crimping deforms the inner ring 2, the bearing clearance would deviate from the predetermined value, making it difficult to obtain the intended bearing characteristics.

Further, since expensive bearing steels, for example, high carbon steels such as SUJ2 defined by JIS G 4805 as high carbon chromium steels for bearings have been used for inner rings 2, there has been a problem that this leads to increasing the costs of products.

Further, in the case of the crimping method which finds a load-displacement curve for the end of the hub ring 1 and controls the punch $m$ such that the load is of a predetermined value, variations in load during actual machining with respect to the predetermined load value or variations in hardness and dimension of raw material directly appear as variations in the amount of preload, making it difficult to control the amount of preload so as to keep the latter in a suitable range. Further, since the greater the lowering speed of the punch $m$, the greater the gradient of load and the lower the accuracy of load control, actual machining is performed with the lower speed of the punch $m$ set at a value on the conservative side, making it difficult to increase the machining efficiency.

Further, in the case of the common crimping method with the lower dead point of the punch kept constant, the machining efficiency can be increased by increasing the lowering speed of the punch, decreasing the variations in preload due to variations in the hardness of the raw material. However, there is still a problem that variations in dimension of the raw material inevitably increase variations in the amount of preload.

SUMMARY OF THE INVENTION

An object of the invention is to provide an inexpensive wheel bearing device which inhibits the deformation of an inner ring and is superior in durability.

A wheel bearing device according to the invention comprises an outer member having a car body-attached flange attached to a car body and two rows of raceway surfaces in the inner periphery, an inner member composed of a hub ring having a wheel-attaching flange for attaching a wheel and formed with one raceway surface in the outer periphery and an inner ring fitted on a small-diameter stepped portion of said hub ring and formed with the other raceway surface in the outer periphery, and two rows of rolling elements installed between the respective raceway surfaces of said inner and outer members, the end extending from the small-diameter stepped portion of said hub ring being crimped for their inseparable integration, and said wheel bearing device is characterized by the following points;

① The end of said hub ring before being crimped is in the form of a hollow cylindrical portion whose wall-thickness gradually increases toward the front end. ② The outer end surface of said crimp portion is formed of a first taper surface whose wall thickness gradually increases from a deformation start point side in the direction of the outer diameter and the angle formed between said first taper surface and a radial plane is set within the range of 0–30°.

This makes it possible to reduce the deformation of the inner ring to a negligible extent, so that the distance from the crimp portion to the position where the rolling elements and the inner ring contact each other can be reduced provided that the rolling fatigue life is secured, and the inner ring and hub ring are designed compactly in the direction of the axle. Therefore, reduction of product weight can be attained and application of the invention to automobiles makes it easier to improve fuel economy and to reduce loading on terrestrial environment. Further, since material costs and process costs for the hub ring and inner ring are reduced, an inexpensive wheel bearing device can be provided.

In the paragraph ①, the end of the hub ring before being crimped is in the form of a hollow cylindrical portion whose wall-thickness gradually increases toward the front end, so that the amount of material which is forced to spread by the punch in the early stages of processing increases; therefore, an axial dimension by which the end of the hub ring is plastically deformed will become short and the deformation will conform to the punch shape in its early stages, making it possible to fix the inner ring firmly. Further, it is preferable that the cylindrical portion of the end of the hub ring be formed such that its outer diameter slightly decreases toward the front end. This facilitates the operation involved in press-fitting the inner ring on the hub ring during attaching the inner ring to the hub. Further, it is desirable that the corner of the end surface in the cylindrical portion at the end of the hub ring before crimping be rounded. This prevents defects, such as burrs or cracks, occurring when the cylindrical portion of the hub ring is crimped.

In the paragraph ②, the outer end surface of the crimp portion is formed of a first taper surface whose wall thickness gradually increases from a deformation start point side in the direction of the outer diameter and the angle formed between said first taper surface and a radial plane is set within the range of 0–30°. This arrangement makes it possible to improve the yield strength resisting the extraction of the inner ring and to prevent deformation of the inner ring. Further, it is desirable that the outer end surface of said crimp portion be formed along the outer peripheral edge extending from the first taper surface to a second taper surface and that the angle formed between said second taper surface and a radial plane is set within the range of 45–50°. This arrangement makes it possible to impart proper preload and precludes the possibility of burrs being produced during crimping. Further, if the first and second taper surfaces are interconnected by a curved surface having a predetermined radius of curvature to contact said two taper surfaces, this is desirable in that it is possible to prevent scratching and burring during crimping and to impart proper preload.

In the above arrangement, it is desirable that a chamfered portion formed in the inner diameter end of the inner ring be arcuate and that its axial and radial dimensions be about 1 mm. Making the chamfered portion of the inner diameter end surface of the inner ring arcuate with a radius of curvature of 1–2.5 mm and letting its axial and radial dimensions be about 1 mm inhibits the crimp portion from forcing the inner ring to spread diametrically outward when fixing the inner rig to the hub ring and minimizes the deformation of the inner ring. Further, it is desirable that the outer diameter surface of the end of the hub ring be formed with an annular groove and that part of said annular groove be positioned to touch the chamfered portion at the inner diameter end of the inner ring. This further inhibits the crimp portion from forcing the inner ring to spread diametrically outward.

In addition, it is desirable that the hub ring be made of carbon steel with 0.45–0.80 wt %, preferably 0.60–0.80 wt % C and be formed in a predetermined region thereof with a surface hardened layer prepared by induction hardening. Further, it is desirable that the inner ring be made of carbon steel with 0.60–0.80 wt % C, and hardened to the core. Therefore, the workability (forging) can be improved by an amount corresponding to the smaller amount of carbon than in high carbon steels while maintaining the desired rolling fatigue life. Since the hub ring is formed with the surface hardened layer prepared by induction hardening in a predetermined region and since the inner ring is hardened to the core, it is possible to inhibit the lowering of the hardness to improve the rolling fatigue life.

Another object of the invention is to provide a crimping method for wheel bearing devices which inhibits the variation of the amount of preload and which is highly reliable.

A crimping method for wheel bearing devices according to the invention is applied to a wheel bearing device which comprises an inner member having a wheel-attaching flange and two rows of raceway surfaces in the outer periphery, an outer member having a car body-attached flange in the outer periphery and two rows of raceway surfaces in the inner periphery, and two rows of rolling elements installed between the raceway surfaces of said inner and outer members, said inner member being composed of a hub ring having a wheel-attaching flange and one raceway surface and an inner ring press-fitted in said hub ring and having the other raceway surface, said method being characterized by the following.

In press-fitting said inner ring in the hub ring to a predetermined position and crimping one end of the hub ring by a crimping punch to thereby impart preload to the rolling elements, the method comprises the steps of measuring the axial dimension from the end surface of said inner ring to the reference surface of the hub ring, controlling the lower dead point of the crimping punch according to said dimension, and crimping so that the worked head height of the crimp portion of the hub ring takes a predetermined value.

In addition, the invention is applicable to a wheel bearing device in which the inner member is composed of a hub ring having a wheel-attaching flange and one raceway surface and the outer joint member of a constant velocity joint press-fitted in said hub ring and having the other raceway surface. In this case, in press-fitting the outer joint member in the hub ring to a predetermined position and then crimping one end of the outer joint member by a crimping punch to thereby impart preload to the rolling elements, the method is characterized by comprising the steps of measuring the axial dimension from the end surface of said hub ring to the reference surface of the outer joint member, controlling the lower dead point of the crimping punch according to said dimension, and crimping so that the worked head height of the crimp portion of the outer joint member takes a predetermined value.

Since the crimping operation for imparting preload to the rolling elements of the wheel bearing device is effected by controlling the lower dead point of the crimping punch on the basis of the relative axial dimensions of the hub ring and inner ring before crimping or the constant velocity joint and hub ring so that the worked head height of the crimp portion takes a predetermined value, it is possible to accurately impart a necessary amount of preload to the rolling elements without being very much influenced by variations in the dimension, shape or hardness of the crimp portion, and without degrading the efficiency of operating using the crimping punch; thus, a wheel bearing device in which the variation of the amount of preload is inhibited and which is highly reliable can be provided.

DESCRIPTION OF PREFERRED EMBODIMENTS

Figure 1:
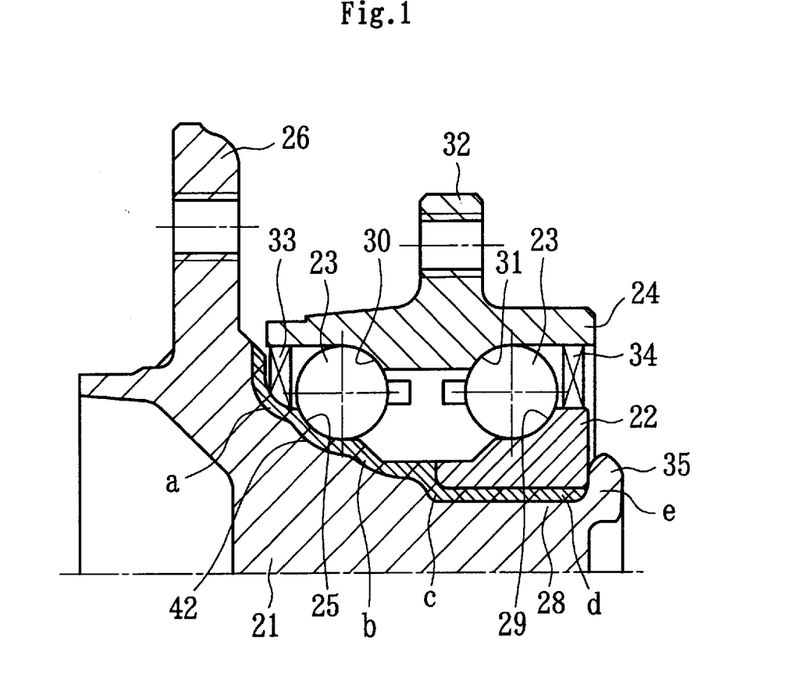
FIG. 1 is a half section showing a wheel bearing device according to an embodiment of the invention.

A wheel bearing device shown in FIG. 1 according to an embodiment comprises a hub ring 21, an inner ring 22, two rows of rolling elements 23, and an outer ring 24.

The hub ring 21 is formed on its outer peripheral surface with a raceway surface 25 on the outboard side and is provided with a flange 26 for attaching a wheel (not show). Hub bolts (not shown) for fixing a wheel disk are circumferentially equidistantly attached in the flange 26. Further, the inner ring 22 is fitted in a small-diameter stepped portion 28 formed on the inboard side of the hub ring 21, and is formed at its outer peripheral surface with a raceway surface 29 on the inboard side. The inner ring 22 is press-fitted with a suitable amount of interference in order to prevent creep. The raceway surfaces 25 and 29 positioned on the outboard and inboard sides of a vehicle, respectively, cooperate with each other to constitute two rows of raceway surfaces.

The outer ring 24 is formed at its inner peripheral surface with two rows of raceway surfaces 30 and 31 opposed to the raceway surfaces 25 and 29 of the hub ring 21 and inner ring 22 and is provided with a flange 32 for attachment to the vehicle. Rolling elements 23 are installed between the raceway surfaces 125, 29 of the hub ring 21 and inner ring 22 and two rows of raceway surfaces 30 and 31 of the outer ring 24. Seals 33 and 34 are installed in the openings in the opposite ends of the wheel bearing, that is, between the outer peripheral surfaces of the hub ring 21 and inner ring 22 and the inner peripheral surface of the outer ring 24, so as to prevent leakage of the grease filled therein and intrusion of water or foreign matter from outside.

In the case where this wheel bearing device is used for driven wheels, in order to prevent falling of the inner ring 22 press-fitted in the small-diameter stepped portion 28 of the hub ring 21, a cylindrical portion extending from the small-diameter stepped portion 28 of the hub ring 21 and formed on the end projecting from the inner ring 22 is diametrically outwardly crimped, and the inner ring 22 is fixed on the hub ring 21 by the thus-formed crimped portion 35. Crimping the cylindrical portion of the hub ring 21 sets the bearing clearance at a predetermined value.

Figure 2:
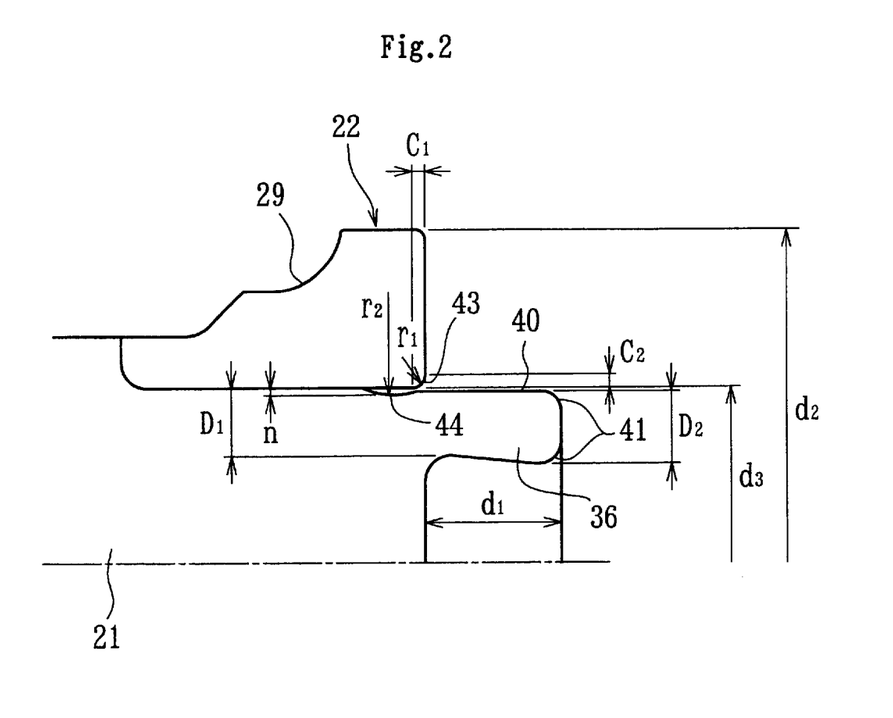
FIG. 2 is a half section showing the end of a hub ring before crimping and an inner ring according to the embodiment of the invention.

FIG. 2 shows the cylindrical portion of the end of the hub ring 21 before crimping, and the inner ring 22 press-fitted in the small-diameter stepped potion 28 of the hub ring 21.

The end of the hub ring 21 before crimping forms the hollow cylindrical portion 36, as described above. This cylindrical portion 36 has a given axial depth $d_1$ and gradually increases in wall-thickness toward the front end. The axial depth $d_1$ of the cylindrical portion 36 is a dimension which is determined by the required performance of the product. As the depth $d_1$ becomes greater, diametrically outward deformation of the inner ring 22 due to crimping becomes smaller, but the crimping strength becomes somewhat decreases. Let root thickness $D_1$ be the difference between the outside radius and the inside radius of the cylindrical portion 36 at the bottom position. This cylindrical portion 36 has a shape which gradually increases toward the front end such that the front end thickness $D_2$ is larger than the root thickness $D_1$.

As compared with the case where front end thickness $D_2$ is equal to or smaller than the root thickness $D_1$, the amount of material by which the front end is forced to spread by the punch in the early stages of processing increases, so that an axial dimension by which the cylindrical portion 36 of the hub ring 21 is plastically deformed will become short and the deformation will conform to the punch shape in its early stages, making it possible to fix the inner ring 22 firmly.

Further, as shown in FIG. 2, before crimping, the cylindrical portion 36 of the end of the hub ring 21 is shaped such that its outer diameter slightly decreases toward the front end. That is, the outer diameter of the cylindrical portion 36 is reduced by 0.05–0.25 mm or thereabout to form an outer diameter surface 40 extending axially 5–12 mm or thereabout. This facilitates the operation of press-fitting the inner ring 22 onto the hub ring 21 when the inner ring 22 is to be attached to the hub ring 21, reducing the cost involved in constructing the press-fitting facility, making it possible to achieve cost reduction. In addition, the same effect may be attained by forming the inner diameter outboard region of the inner ring 22 with an outer diameter surface increased in diameter by 0.05–0.25 mm or thereabout extending axially 5–12 mm or thereabout.

Further, before crimping, the corner 41 of the end surface of the cylindrical portion 36 of the hub ring 21 is rounded. This prevents defects, such as burrs or cracks, occurring when the cylindrical portion 36 of the hub ring 21 is crimped.

The hub ring 21 is made of medium carbon steel with 0.45–0.80 wt %, preferably 0.60–0.80 wt % C, and is formed in a predetermined region thereof with a surface hardened layer 42 hardened by induction hardening, as shown in FIG. 1. Further, the inner ring 22 is made of medium carbon steel with 0.60–0.80 wt % C, and hardened to the core. Therefore, the workability (forging) improves by an amount corresponding to the smaller amount of carbon than in high carbon steels such as SUJ2 (0.95–1.10 wt % C) defined by JIS G 4805.

Further, as to the hub ring 21, the formation of the surface hardened layer 42 by induction hardening in a predetermined region improves the rolling fatigue life and prevents fretting between the fitting surfaces. As to the inner ring 22, in consideration of the fact that the raceway surface 29 on the inboard side is vitally severe region, the hardening to the core inhibits the lowering of hardness and improves the strength and the rolling fatigue life. In order to meet the requirements of strength, wear resistance and rolling fatigue life which are necessary for the function of the product, C is required to be 0.45 wt % or more for the hub ring 21 and 0.60 wt % or more for the inner ring 22, and if C exceeds 0.80 wt %, workability, machinability or toughness will lower; therefore, this value should be the upper limit.

The surface hardened layer 42 of the hub ring 21 is formed in a predetermined region of the hub ring 21, that is, on the outer peripheral surface of the hub ring 21 with which the seal lip of the seal 33 installed in the outboard side end of the outer ring 24 is in slide contact, that is, in a region extending from the seal slide contact portion to the small-diameter stepped portion 28 via the raceway surface 25.

Portions of the surface hardened layer 42 are indicated by a through d. The a-portion is the seal lip portion with which the seal lip of the seal 33 is in slide contact, so that wear resistance is required. The b-portion is the raceway surface 25 along which the rolling elements 23 roll, so that substantial service life is required. The c-portion is the portion which butts against the inner ring 22, and the d-portion is the portion at which the inner ring 22 is fitted on the hub ring 21, so that creep resistance and fretting resistance are required. In addition, the e-portion is a crimp portion 35, so that ductility is required.

The heat treatment for forming the surface hardened layer 42, suitably, is by induction hardening. Induction heat treatment as the surface hardening treatment permits full use of the features of induction heating to freely select the hardening layer 42 and impart wear resistance or improve fatigue strength. Induction heating is a method of generating heat by converting electrical energy directly into heat energy within a metal through utilization of the phenomenon of electromagnetic induction, and induction heat treatment utilizing this has many features. Particularly, local heating is possible, and the depth of the hardening, layer can be selectively determined. Since induction heat treatment can be controlled so that no other area than the hardening layer is considerably thermally affected, the performance of the base material can be retained. It is possible to form the desired hardening layer 42 in the region of the a- through d-portions while leaving the e-portion in the state of the base material which is unhardened.

As shown in FIG. 2, the inner diameter end of the inner ring 22 is formed with a chamfered portion 43. The chamfered surface 43, which connects the inboard side end surface and the inner diameter surface of the inner ring 22, has a circular arc with a radius of curvature $r_1$ which is 1–2.5 mm. Further, the outer diameter surface of the cylindrical portion 36 of the hub ring 21 is formed with an annular groove 44 having a depth $\underline{n}$ of about 0.5 mm and a radius of curvature $r_2$ of 5–10 mm or thereabout such that part of the annular groove 44 touches the chamfered portion 43 of the inner ring 22. This formation of the chamfered portion 43 at the inner diameter end of the inner ring 22 and the annular grove 44 in the cylindrical portion 36 of the hub ring 21 ensures that even if the cylindrical portion 36 of the hub ring 21 is crimped, the inner ring 22 can be inhibited from diametrically outwardly spreading and that deformation of the inner ring 22 can be held down to a minimum.

If the radius of curvature $r_1$ of the chamfered portion 43 of the inner ring 22 is less than 1 mm, application of a load on the wheel bearing device during running of the automobile can result in damage such as cracks being produced by stress concentration on the root portion of the crimp portion 35. Reversely, if the radius of curvature $r_1$ of the chamfered portion 43 is greater than 2.5 mm (including the comparative example having an inclined surface 45 shown in FIG. 4), crimping the cylindrical portion 36 of the hub ring 21 results in the crimp portion 35, which has undergone plastic deformation, diametrically outwardly spreading the large chamfered portion 43 of the inner ring 22, which, in turn, results in the outer diameter surface of the inner ring 22 being considerably deformed, so that the bearing clearance can deviate from the predetermined value, thus making it difficult to achieve the intended bearing characteristics.

In addition, the chamfered portion 43 may be continuously formed using such a radius of curvature that it contacts the inboard side end surface and inner diameter surface of the inner ring 22. However, in consideration of the fact that this is difficult unless chamfering is performed after heat treatment of the inner ring 22, it is preferable that the axial and radial dimensions $c_1$ and $c_2$ of the chamfered portion 43 be set at values somewhat smaller than the radius of curvature $r_1$. This permits the chamfered portion 43 to be formed before the heat treatment of the inner ring 22, thus eliminating chamfering after heat treatment.

Figure 3:
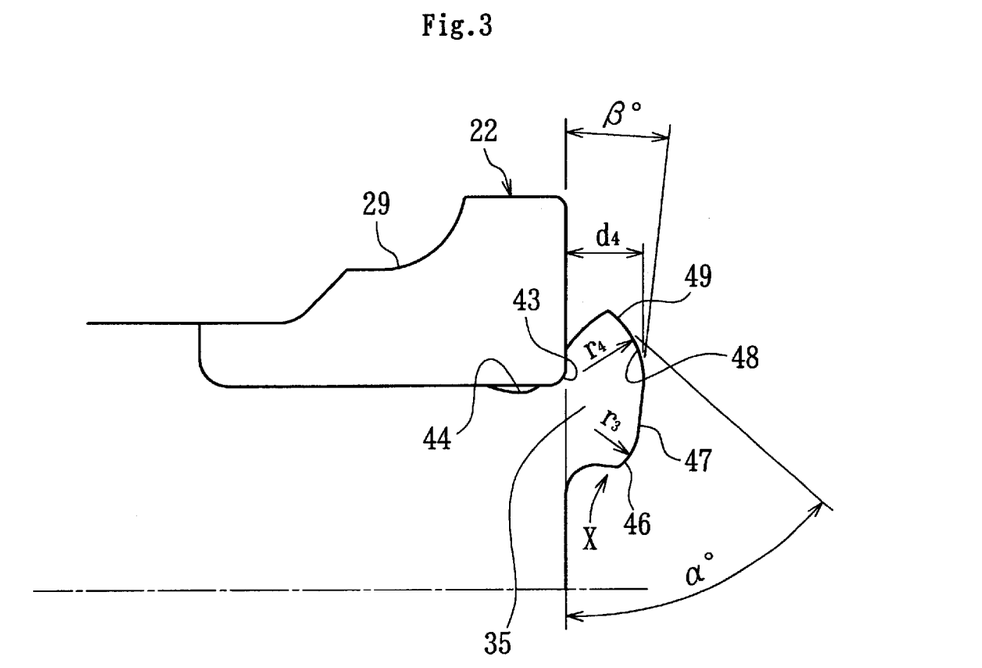
FIG. 3 is a half section showing the end of a hub ring after crimping and an inner ring according to the embodiment of the invention.

FIG. 3 shows the crimp portion 35 after the crimping of the cylindrical portion 36 of the hub ring 21 shown in FIG. 2.

This crimp portion 35 comprises a first curved surface 46 having a radius of curvature $r_3$ as viewed from the inner diameter side toward the outer diameter side, a first taper surface 47 whose wall thickness gradually increases from a deformation start point X side in the direction of the outer diameter, a second curved surface 48 having a radius of curvature $r_4$, and a second taper surface 49 forming an angle $\alpha°$ with respect to a plane along the radial direction, said crimp portion having an axial length of $d_4$ from the inboard side end surface of the inner ring 22 to the top of the crimp portion 35.

In the shape of the crimp portion 35, if the radius of curvature $r_3$ of the first curved surface 46 is less than 3 mm, then the crimping punch tends to have its working surface scored during crimping, leading to shortening the life of the punch. Further, if the radius of curvature $r_3$ is larger than 5 mm, then it would be necessary to push out the cylindrical portion 36 of the hub ring 21 axially forward toward the outboard side by the punch during crimping unless the end of the cylindrical portion 36 is spread by preliminary forming before crimping; without pushing out, rigorous rubbing would occur between the inner diameter surface of the cylindrical portion of the hub ring 21 and the punch, producing burrs. Therefore, the radius of curvature $r_3$ of the first curved surface 46 is preferably 3–5 mm or thereabout.

The first taper surface 47 forms an angle $\beta°$ with respect to a plane along the radial direction, and it has been found that if the angle $\beta°$ takes a minus value, the pull-out resisting strength of the inner ring 22 lowers and that if it becomes greater than 30°, the force which radially spreads the inner ring 22 increases, producing an unignorable deformation in the inner ring 22. Therefore, the angle β° of the first taper surface 47 is preferably 0–30° or thereabout.

If the radius of curvature $r_4$ of the second curved surface 48 is less than 2 mm, then the punch tends to have its working surface scored during crimping, leading to shortening the life of the punch. Further, if the radius of curvature $r_4$ is greater than 10 mm, then the force with which the crimp portion 35 pushes the inner ring 22 decreases, making it difficult to impart proper preload. Therefore, the radius of curvature $r_4$ of the second curved surface 48 is preferably 2–10 mm or thereabout.

If the angle α° of the second taper surface 49 is less than 45°, then the force with which the crimp portion 35 pushes the inner ring 22 decreases, making it difficult to impart proper preload. Further, if the angle α° is greater than 50°, then rigorous rubbing occurs between the end of the cylindrical portion 36 of the hub ring 21 with the crimp portion 35 tending to spread to the outer diameter side, and the punch, thus producing burrs. Thus, the angle α° of the second taper surface 49 is preferably 45–50° or thereabout.

However, in the case crimping is effected such that no contact occurs between the second curved surface 48 and the first taper surface 47, the second taper surface 49 can be omitted by increasing the radius of curvature $r_4$ in the second curved surface 48. In this case, preferably a third curved surface having a radius of curvature of 1–3 mm or thereabout may be formed in the junction between the second curved surface 48 and the first taper surface 47, thereby inhibiting burrs otherwise produced in the vicinity of the joint, improving the life of the punch.

In addition, in the after-crimping shape, deformation of the inner ring 22 can be minimized by leaving the annular groove 44 in the outer diameter surface of the hub ring 21 and forming the chamfered portion 43 in the inner diameter end of the inner ring 22.

Figure 4:
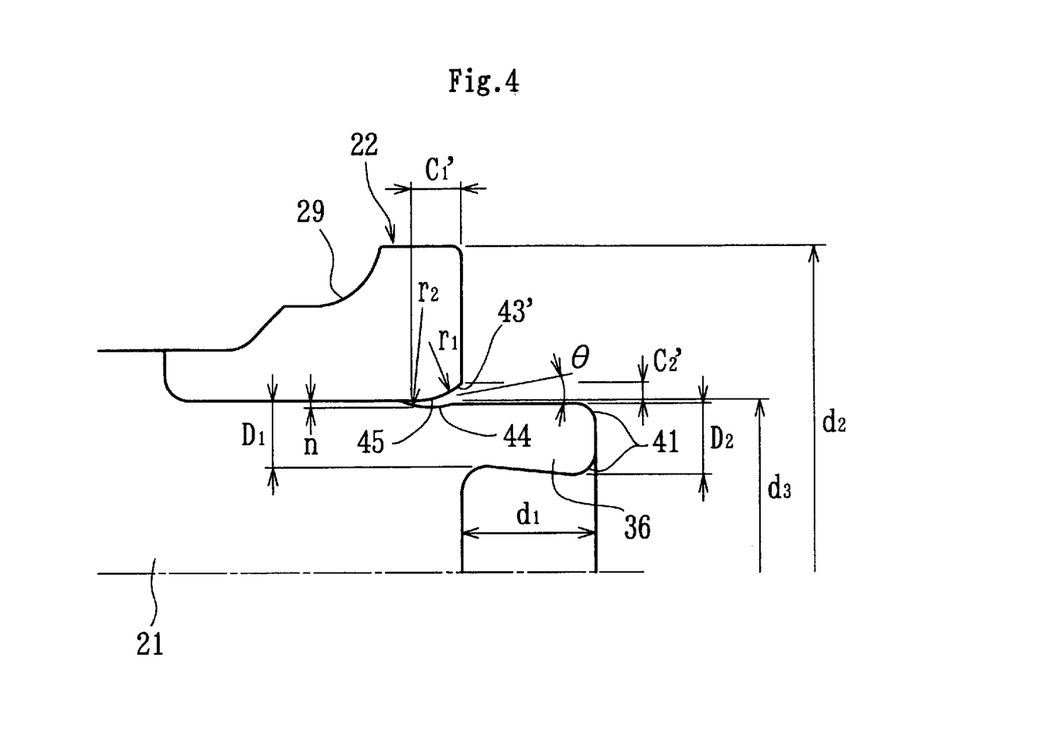
FIG. 4 is a half section of a comparative example for the embodiment of FIG. 2, showing the end of a hub ring before crimping and an inner ring.

The form showing the end of the hub ring 21 before crimping and the inner ring 22 in FIG. 2 is taken up as an embodiment, and the form showing the end of the hub ring 21 before crimping and the inner ring 22 in FIG. 4 is taken up as a comparative example. In the comparative example of FIG. 4, a chamfered portion 43, which connects the large inclined surface 45, the inboard side end surface and the inner diameter surface is formed in the inner diameter end of the inner ring 22 before crimping, that is, the inner peripheral end. In addition, the rest of the shape in the end of the hub ring 21 is the same as in FIG. 2.

In the comparative example of FIG. 4, the outer and inner diameters $d_2$ and $d_3$ of the inner ring 22 are 58.8 mm and 28 mm, the axial dimension $c_1'$ of the inclined surface 45 and chamfered portion 43 is 3.5 mm and their radial dimension $c_2'$ is 1.5 mm, the angle θ of the inclined surface is 15°, the radius of curvature $r_1'$ of the chamfered portion 43 is 5 mm, and the outer diameter surface of the cylindrical portion 36 of the hub ring 21 is formed with an annular groove 44 having a depth $\underline{n}$ of about 0.5 mm and a radius of curvature $r_2$ of about 7.8 mm in such a manner that part of the annular grove 44 touches the chamfered portion 43' of the inner ring 22, in which case, the outer diameter of the inner ring 22 as measured at a position 2 mm away from the end surface of the inner ring 22 is expanded about 35 μm by crimping.

In contrast thereto, in the embodiment of FIG. 2, the outer and inner diameters $d_2$ and $d_3$ of the inner ring 22 are 58.8 mm and 28 mm, the axial dimension $c_1$ of the chamfered portion 43 is 1 mm and its radial dimension $c_2$ is 1 mm and radius of curvature $r_1$ is 1.5 mm, and the outer diameter surface of the cylindrical portion 36 of the hub ring 21 is formed with an annular groove 44 having a depth $\underline{n}$ of about 0.5 mm and a radius of curvature $r_2$ of about 7.8 mm in such a manner that part of the annular grove 44 touches the chamfered portion 43 of the inner ring 22, in which case, the outer diameter of the inner ring 22 as measured at a position 2 mm away from the end surface of the inner ring 22 was expanded only about 15 μm by crimping.

In addition, in the embodiment of FIG. 2 and comparative example of FIG. 4, the crimp portion 35 after crimping has a size such that, as shown in FIG. 3, the radius of curvature $r_3$ of the first curved surface 46 is 3 mm, the angle β° of the first taper surface 47 is 5°, the radius of curvature $r_4$ of the second curved surface 48 is 4.2 mm, the angle α° of the second taper surface 49 is 48.3°, the axial length $d_4$ from the inboard side end surface of the inner ring 22 to the top of the crimp portion 35 is 5.4 mm; the deformation of the inner ring 22 is held down to a minimum by leaving the annular groove 44 in the outer diameter surface of the hub ring 21 after crimping and by forming the chamfered portion 43 in the inner diameter end of the inner ring 22.

The crimping of the cylindrical portion 36 of the hub ring 21 is effected in the following manner.

Figure 5A:
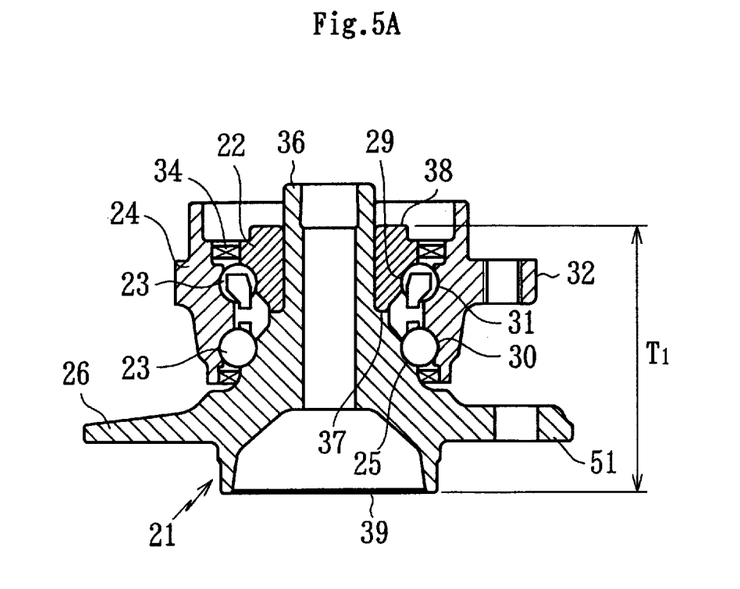
FIG. 5(A) is a longitudinal section showing the wheel bearing device before crimping according to the embodiment of the invention and (B) is a longitudinal section showing the same after crimping.
Figure 5B:
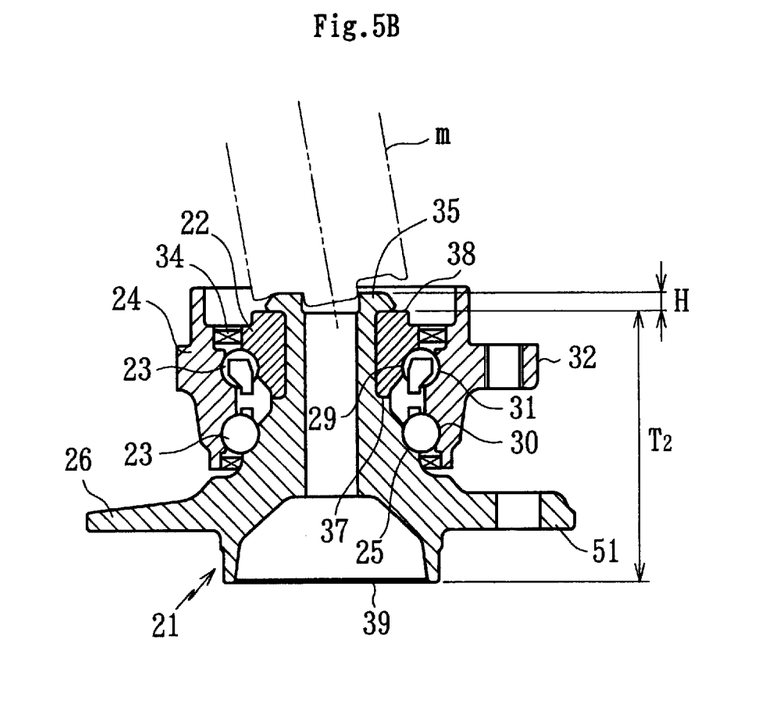

FIGS. 5(A) and (B) show the wheel bearing device before and after crimping, respectively. FIG. 5(A) shows the inner ring 22 being press-fitted on the hub ring 21 till a predetermined position where it butts against a shoulder 37, when the cylindrical portion 36 of the hub ring 21 projects out of the end surface 38 of the inner ring 22. As shown in FIG. 5(B), crimping this projecting cylindrical portion 36 by a crimping punch $\underline{m}$ imparts a proper amount of preload to the rolling elements 23.

The punch $\underline{m}$ is e.g., of the vertical oscillation type, which, with the wheel bearing device fixed in its vertical position by fixing means (not shown), is adapted to be lowered from immediately above the cylindrical portion 36 of the hub ring 21 while performing oscillatory rotation, thereby gradually crimping the cylindrical portion 36 toward the end surface 38 of the inner ring 22, thus forming a crimp portion 35 as shown in FIG. 5(B).

The crimping method of this embodiment comprises the steps of measuring the axial dimension $T_1$ (hereinafter referred to simply as dimension) from the end surface 38 of the inner ring 22 to the reference surface of the hub ring 21, e.g., to the end surface 39 in the before-crimping state of FIG. 5(A), controlling the lower dead point for crimping the cylindrical portion 36 of the hub ring 21 by the punch $\underline{m}$ according to the dimension $T_1$, and crimping in such a manner that the height H of the head, worked by the punch $\underline{m}$, of the crimp portion takes a predetermined value, as shown in FIG. 5(B). Detailed technical content of this crimping method will be described with reference to FIG. 6.

Figure 6:
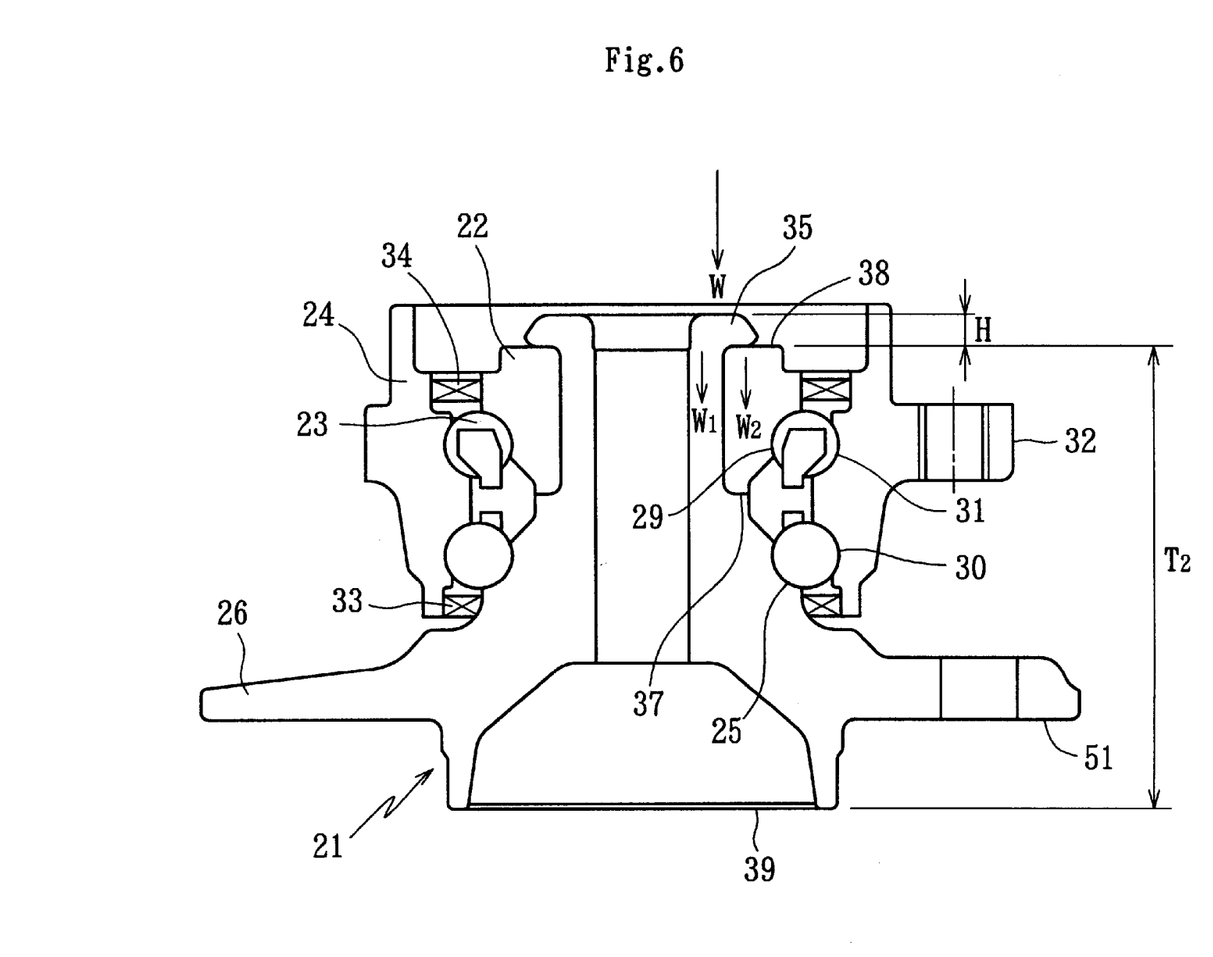
FIG. 6 is an enlarged sectional view of the wheel bearing device of FIG. 5.

In FIG. 6, W denotes a processing load required for crimping by the punch $\underline{m}$; $W_1$ denotes the force axially acting on the hub ring 21 during crimping; $W_2$ denotes the force axially acting on the inner ring 22; and $T_2$ denotes the dimension from the end surface 38 of the inner ring 22 to the end surface 39 of the hub ring 21 in the after-crimping state shown in FIGS. 6 and 5(B).

Further, let K be the ratio between $W_1$ and $W_2$ when the dimension $T_1$ shown in FIG. 5(A) is neither too large nor too small, or so-called optimum $T_x$, $K=(W_1/W_2)$. In addition, K is for the sake of convenience for explaining the large-small relation between $W_1$ and $W_2$ and is not a value found by actual measurement.

During crimping by the punch $\underline{m}$ of FIG. 5(B), if processing is effected with the lower dead point of the punch $\underline{m}$ held constant as in the prior art, the following defects (1) through (3) occur.

(1) In the case where the before-crimping dimension $T_1$ is smaller than the optimum value $T_x$, the height H of the worked head increases while the area with which the crimp portion 35 contacts the end surface 38 of the inner ring 22 decreases, so that $W_2$ decreases relative to $W_1$ and $K<(W_1/W_2)$. Therefore, when the load is removed by lifting the punch m upon completion of crimping, the hub ring 21 and inner ring 22 increase in dimension through spring-back, but the amount of increase for the inner ring 22 is smaller and the amount of increase for the hub ring 21 is larger than when $K=(W_1/W_2)$. As a result, the increment $\Delta T=T_2-T_1$ in preload due to crimping decreases.

(2) Reversely, in the case where the before-crimping dimension $T_1$ is larger than the optimum value $T_x$, the height H of the worked head of the crimp portion 35 decreases while the area with which the crimp portion 35 contacts the end surface 38 of the inner ring 22 increases, so that $W_2$ increases relative to $W_1$ and $K>(W_1/W_2)$. Therefore, when the load is removed by lifting the punch m upon completion of crimping, the hub ring 21 and inner ring 22 increase in dimension through spring-back, but the amount of increase for the inner ring 22 is larger and the amount of increase for the hub ring 21 is smaller than when $K=(W_1/W_2)$. As a result, the increment $\Delta T=T_2-T_1$ in preload due to crimping increases.

(3) That is, when crimping is effected with the lower dead point of the punch m held constant, variations in the before-crimping dimension $T_1$ cause variations in the difference in the amount of spring-back between the hub ring 21 and the inner ring 22 to vary when the load is removed after crimping, with the result that it has been difficult to avoid the phenomenon in which variations in the increment $\Delta T=T_2-T_1$ in preload due to crimping increases in variation.

Thus, in order to inhibit the increment $\Delta T=T_2-T_1$ in preload of the paragraph (3) from varying, the lower dead point of the punch m during crimping shown in FIG. 1(B) is varied so as to make constant the worked head height H of the crimp portion 35, thereby making constant the area with which the crimp portion 35 contacts the end surface 38 of the inner ring 22, and the proportion $(W_1/W_2)$ of the component force $W_1$ and $W_2$ of the processing load W during crimping, acting on the hub ring 21 and the inner ring 22, respectively. This inhibits the increment $\Delta T=T_2-T_1$ in preload due to crimping from varying. Specifically, it is advisable to perform either (4) or (5) of the following methods.

(4) The dimension $T_1$ shown in FIG. 5(A) is measured and if this dimension $T_1$ is larger than the optimum value $T_x$ which is the reference dimension of the product, the lowering end for the punch m is lifted by an amount corresponding to the difference $(T_1-T_x)$, thereby controlling the lower dead point of the punch m. Further, the dimension $T_1$ shown in FIG. 5(A) is measured and if this dimension $T_1$ is smaller than the optimum value $T_x$ which is the reference dimension of the product, the lowering end for the punch m is lowered by an amount corresponding to the difference $(T_x-T_1)$, thereby controlling the lower dead point of the punch m.

Controlling the lower dead point of the punch m by vertically moving the lowering end of the punch m according to the dimension permits crimping to be effected so that the worked head height H of the crimp portion 35 of FIG. 5(B) takes a predetermined value. And providing a crimping device with the function of automatically controlling the lower dead point of the punch m permits a required preload to be accurately imparted to the rolling elements of the wheel bearing device without lowering the processing efficiency, and variations in the amount of preload are reliably inhibited.

(5) In the paragraph (4), a description has been given of the case of controlling the lower dead point of the punch m by vertically moving the lowering end for the punch m with respect to the wheel bearing device in the fixed state. However, the same result may also be obtained by placing the wheel bearing device on an elevator or the like, vertically moving the wheel bearing device according to the dimension $T_1$ so as to control the lower dead point of the punch m, and effecting crimping so that worked head height H of the crimp portion 35 takes a predetermined value.

In addition, the before-crimping dimension $T_1$ uses the end surface 39 of the hub ring 21 as the reference surface as shown in FIG. 5(A). However, some other predetermined region of the hub ring 21, for example, the outer end surface 51 of the flange 26 may be used as the reference surface, and $T_1$ may be the dimension from the end surface 51 of the flange 26 to the end. surface 38.

In the embodiment described above, the invention has been applied to a driven-wheel bearing device, but the invention is also applicable to a driving-wheel bearing device. For example, FIGS. 7(A) and (B) show a driving-wheel bearing device, in which the same parts as those shown in FIGS. 5(A) and (B) are denoted by the same reference characters. What differs from the wheel bearing device of FIG. 5 is that the inner member is composed of the outer joint member 70 of a constant velocity joint and a hub ring 80. In addition, FIG. 7(A) shows the wheel bearing device before crimping and FIG. 7(B) shows it after crimping.

Raceway surfaces 25 and 29 are respectively formed on the outer periphery between the mouth portion 72 and stem portion 71 of the outer joint member 70 of the constant velocity joint, and on the outer periphery of the hub ring 80, and rolling elements 23 are installed between the two rows of raceway surfaces 25, 29 and two rows of raceway surfaces 31, 30 formed on the inner periphery of the outer ring 24.

The hub ring 80 is spline-connected to and press-fitted on the outer periphery of the stem portion 71 of the outer joint member 70. This press-fitting continues to a predetermined position where the end surface of the hub ring 80 butts against the shoulder 73 of the outer joint member 70, whereupon, as shown in FIG. 7(A), the cylindrical portion 74 of the stem portion 71 projects out of the outer end surface 83 of the hub ring 80. This projecting cylindrical portion 74 is crimped toward the outer end surface 83 of the hub ring 80, whereby a crimp portion 75 shown in FIG. 7(B) is formed.

Figure 7A:
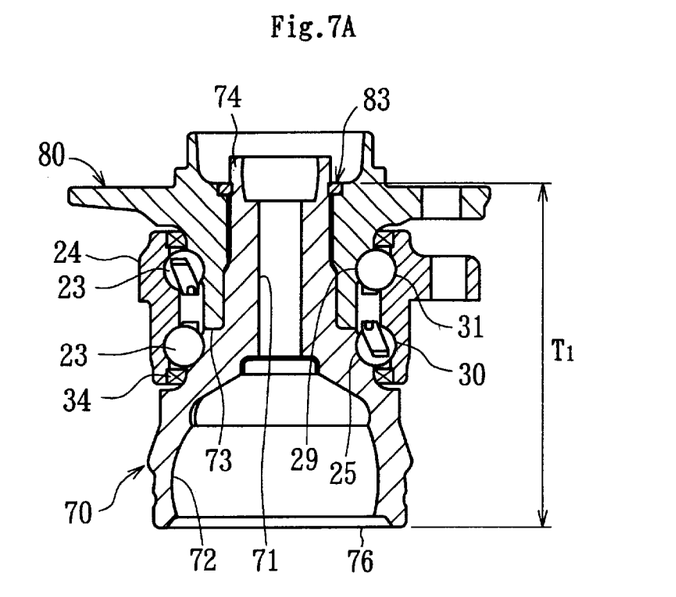
FIG. 7(A) is a longitudinal section showing a wheel bearing device according to another embodiment of the invention, before crimping, and (B) is a longitudinal section showing the same after crimping.
Figure 7B:
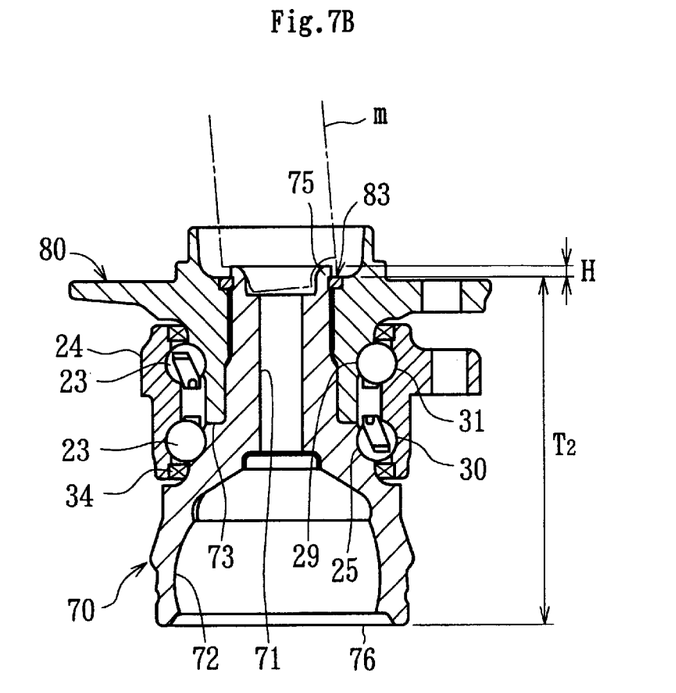

In the wheel bearing device of FIG. 7 also, as shown in FIG. 7(A), the dimension $T_1$ from the outer end surface 83 of the hub ring 80 to the reference surface of the outer joint member 70, i.e., to the end surface 76 of the mouth portion 72 is measured. And, as in the case of the embodiment of FIG. 5, the lower dead point of the punch m is controlled according to the difference between the dimension $T_1$ and the optimum value $T_x$, and crimping is effected so that the worked head height H of the crimp portion 75 of the outer joint member 70 is constant.

When the crimping operation thus terminates, it is possible to accurately impart a necessary amount of preload to the rolling elements in the wheel bearing device, as in the embodiment of FIG. 5, without decreasing the processing efficiency, and the variation of the amount of preload is reliably inhibited.

In addition, in the case of the wheel bearing device of FIG. 7, the before-crimping dimension $T_1$ is measured with the end surface 76 of the mouth portion 72 used as the reference surface. However, it is also possible to use the bottom of the mouth portion 72 or a predetermined portion of the outer periphery of the mouth portion 72 as the reference surface.

Table 1 shows experimental data concerning a comparative example of a conventional method in which crimping is effected with the lower dead point of the punch kept constant, and an embodiment of the invention in which crimping is effected with the lower dead point of the punch controlled according to the before-crimping dimension $T_1$. In addition, the comparative example uses n=48 samples, of which 24 samples have a raw-material hardness of HRC 28 and the remaining 24 samples have a raw-material hardness of HRC 15. The embodiment uses n=10 samples, of which 6 samples have a raw-material hardness of HRC 28 and the remaining 4 samples have a raw-material hardness of HRC 15.

TABLE 1

|  | $T_1$ variation $8\sigma n-1$ | $\Delta T = T_2 - T_1$ variation $8\sigma n-1$ |
|---|---|---|
| Lower dead point is kept constant. (n = 48, 24 articles of hardness HRC 28, 24 articles of hardness HRC 15) | 143 µm | 42 µm |
| Lower dead point is controlled according to $T_1$. (n = 10, 6 articles of hardness HRC 28, 4 articles of hardness HRC 15) | 523 µm | 27 µm |

As can be seen from Table 1, in the embodiment as compared with the comparative example, even if the range of the before-crimping dimension T, is about 3.7 times (523 µm÷143), the range of the increment $\Delta T=T_2-T_1$ in prepressure is about 0.64 times (27 µm÷42 µm), demonstrating the effectiveness of the present invention.

What is claimed is:

1. A wheel bearing device comprising:
   an outer member having a flange configured to be attached to a car body, an inner periphery, and two rows of raceway surfaces in the inner periphery;
   an inner member that comprises a hub ring wherein said hub ring comprises an end and a small-diameter stepped portion, a wheel-attaching flange, wherein said wheel-attaching flange comprises (a) an outer periphery with one raceway surface, (b) an inner ring fitted on the small-diameter stepped portion of the hub ring, and (c) a second raceway surface;
   two rows of rolling elements installed between the respective raceway surfaces of said inner and outer members, the end extending from the small-diameter stepped portion of said hub ring being crimped for inseparable integration; and wherein
   the end of said hub ring before being crimped is in the form of a hollow cylindrical portion and wherein the hollow cylindrical portion has a wall thickness that gradually increases towards a front end.

2. A wheel bearing device as set forth in claim 1, characterized in that the cylindrical portion formed in the end of said hub ring before crimping is formed such that its outer diameter slightly decreases toward the front end.

3. A wheel bearing device as set forth in claim 1 or 2, characterized in that the corner of the end surface of the cylindrical portion formed in the end of said hub ring before crimping is rounded.

4. A wheel bearing device comprising an outer member having a car body-attached flange attached to a car body and two rows of raceway surfaces in the inner periphery, an inner member composed of a hub ring having a wheel-attaching flange for attaching a wheel and formed with one raceway surface in the outer periphery and an inner ring fitted on a small-diameter stepped portion of said hub ring and formed with the other raceway surface in the outer periphery, and two rows of rolling elements installed between the respective raceway surfaces of said inner and outer members, the end extending from the small-diameter stepped portion of said hub ring being plastically deformed to form crimp portion for their inseparable integration, said wheel bearing device being characterized in that the outer end surface of said crimp portion is formed of a first taper surface whose wall thickness gradually increases from a deformation start point side in the direction of the outer diameter and the angle formed between said first taper surface and a radial plane is set within the range of 0–30°.

5. A wheel bearing device as set forth in claim 4, characterized in that the outer end surface of said crimp portion is formed along the outer peripheral edge extending from the first taper surface to a second taper surface and that the angle formed between said second taper surface and a radial plane is set within the range of 45–50°.

6. A wheel bearing device as set forth in claim 5, characterized in that the first and second taper surfaces are interconnected by a curved surface having a predetermined radius of curvature to contact said two taper surfaces.

7. A wheel bearing device as set forth in claim 1 or 4, characterized in that a chamfered portion formed in the inner diameter end of said inner ring is arcuate and its axial and radial dimensions are about 1 mm.

8. A wheel bearing device as set forth in claim 7, characterized in that the outer diameter surface of the end of said hub ring is formed with an annular groove, part of said annular groove touching the chamfered portion formed in the inner diameter end of said inner ring.

9. A wheel bearing device as set forth in claim 1 or 4, characterized in that said hub ring is made of carbon steel with 0.45–0.80 wt % C and is formed at a predetermined region thereof with a surface hardened layer hardened by induction hardening.

10. A wheel bearing device as set forth in claim 1 or 4, characterized in that said inner ring is made of carbon steel with 0.60–0.80 wt % C, and hardened to the core.

11. A crimping method for a wheel bearing device which comprises an inner member having a wheel-attaching flange and two rows of raceway surfaces in the outer periphery, an outer member having a car body-attached flange in the outer periphery and two rows of raceway surfaces in the inner periphery, and two rows of rolling elements received between the raceway surfaces of said inner and outer members, said inner member being composed of a hub ring having a wheel-attaching flange and one raceway surface and an inner ring press-fitted in said hub ring and having the other raceway surface, wherein said inner ring is press-fitted in the hub ring to a predetermined position and one end of the hub ring is crimped by a crimping punch, thereby imparting preload to the rolling elements, said crimping method being characterized by comprising the steps of measuring the axial dimension from the end surface of said inner ring to the reference surface of the hub ring, controlling the lower dead, point of the crimping punch according to said dimension, crimping so that the worked head height of the crimp portion of the hub ring takes a predetermined value, and making constant an area with which the crimp portion contacts the end surface of the inner ring.

12. A crimping method for a wheel bearing device which comprises an inner member having a wheel-attaching flange and two rows of raceway surfaces in the outer periphery, an outer member having a car body-attached flange in the outer periphery and two rows of raceway surfaces in the inner periphery, and two rows of rolling elements received between the raceway surfaces of said inner and outer members, said inner member being composed of a hub ring having a wheel-attaching flange and one raceway surface and the outer joint member of a constant velocity joint press-fitted in said hub ring and having the other raceway surface, wherein said outer joint member is press-fitted in the hub ring to a predetermined position and one end of the outer joint member is crimped by a crimping punch, thereby imparting preload to the rolling elements, said crimping method being characterized by comprising the steps of measuring the axial dimension from the end surface of said hub ring to the reference surface of the outer joint member, controlling the lower dead point of the crimping punch according to said dimension, and crimping so that the worked head height of the crimp portion of the outer joint member takes a predetermined value, and making constant an area with which the crimp portion contacts the end surface of the inner ring.

* * * * *